(12) United States Patent
Goodsitt et al.

(10) Patent No.: US 11,914,583 B2
(45) Date of Patent: Feb. 27, 2024

(54) UTILIZING REGULAR EXPRESSION EMBEDDINGS FOR NAMED ENTITY RECOGNITION SYSTEMS

(71) Applicant: Capital One Services, LLC, McLean, VA (US)

(72) Inventors: Jeremy Edward Goodsitt, Champaign, IL (US); Austin Grant Walters, Savoy, IL (US); Reza Farivar, Champaign, IL (US); Mark Louis Watson, Sedona, AZ (US); Anh Truong, Champaign, IL (US); Galen Rafferty, Mahomet, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 17/022,594

(22) Filed: Sep. 16, 2020

(65) Prior Publication Data
US 2021/0056099 A1 Feb. 25, 2021

Related U.S. Application Data

(63) Continuation of application No. 16/549,786, filed on Aug. 23, 2019, now Pat. No. 10,803,057.

(51) Int. Cl.
*G06F 7/00* (2006.01)
*G06F 16/242* (2019.01)
*G06F 16/332* (2019.01)
*G06F 16/35* (2019.01)
*G06N 20/00* (2019.01)
*G06F 16/36* (2019.01)

(52) U.S. Cl.
CPC ........ *G06F 16/243* (2019.01); *G06F 16/3329* (2019.01); *G06F 16/35* (2019.01); *G06N 20/00* (2019.01); *G06F 16/374* (2019.01)

(58) Field of Classification Search
CPC .... G06F 16/243; G06F 16/35; G06F 16/3329; G06F 16/374; G06F 16/22; G06F 16/283; G06N 20/00; G06N 5/02; G06N 3/006
See application file for complete search history.

(56) References Cited

U.S. PATENT DOCUMENTS

| | | | |
|---|---|---|---|
| 8,489,597 B2 * | 7/2013 | Shadmon | G06F 16/81 707/742 |
| 9,535,892 B1 * | 1/2017 | Matthews | G06F 16/951 |
| 2007/0100823 A1 * | 5/2007 | Inmon | G06F 16/3338 |
| 2008/0243905 A1 * | 10/2008 | Pavlov | G06F 16/90344 707/999.102 |

(Continued)

*Primary Examiner* — Mohammad A Sana
(74) *Attorney, Agent, or Firm* — KDW Firm PLLC

(57) ABSTRACT

Various embodiments are directed to a system that utilizes regular expression (regex) to recognize at least portions of characters, words, text, numbers, etc. in a structured or unstructured dataset, any patterns associated therewith, and/ or similarities between the determined patterns. In examples, a regex-based pattern recognition platform may receive a dataset and determine whether at least a first regex pattern and a second regex pattern can be identified. The occurrences of the first and second regex patterns and the frequency of those occurrences may reveal something about the dataset itself or any patterns contained therein.

12 Claims, 8 Drawing Sheets

(56) References Cited

U.S. PATENT DOCUMENTS

2015/0012464 A1* 1/2015 Gilbert .................... G06N 5/02
706/11
2018/0025222 A1* 1/2018 Yellapragada ....... G06V 30/416
382/176

* cited by examiner

UNSTRUCTURED
  DATASET 202

< SSN: 123-45-6789 > ** <CustomerInformation> << Application
>> < [ACTIVE] ExecuteThread: '0' queue: 'logic.kernel'>
< (235) 456 – 8975 > <<<ADDRESS: '5687 Main Street' 'City'
'State'>>
<CustomerOffers> <$10,100.00 USD> <36 months> <3.5%>
<3/15/1982>
<Occupation> <Consultant> <Employer: Acme Consulting Co.>
key store field <NOTICE> <security> <Server 2>
C:\baalt261347\weblog\server
** <John Doe> <CreditScore: 750>
<4589654465226546564216654896> Thread <abcd.efg.com>
ExecuteThread <Account> <45698742222>

REGEX LIST 300

REGEX PATTERN 304 (at least portion of SSN)
REGEX PATTERN 306 (at least portion of customer name)
REGEX PATTERN 308 (at least portion of phone number)
REGEX PATTERN 310 (at least portion of address)
REGEX PATTERN 312 (at least portion of account info)
REGEX PATTERN 314 (at least portion of product offers)
REGEX PATTERN 316 (at least portion of customer credit score)
REGEX PATTERN 318 (at least portion of customer occupation)

.
.
.
.

REGEX PATTERN n (at least portion of customer DOB)

FIG. 3

UNSTRUCTURED
  DATASET 202

< SSN: 123-45-6789 > ** <CustomerInformation> << Application >> < [ACTIVE] ExecuteThread: '0' queue: 'logic.kernel'>
< (235) 456 – 8975 > <<ADDRESS: 5687 Main Street, 'City' 'State'>>
<CustomerOffers> <$10,100.00 USD> <36 months> <3.5%>
<3/15/1982>
<Occupation> <Consultant> <Employer: Acme Consulting Co.>
key store field <NOTICE> <security> <Server 2>
C:\baalt261347\weblog\server
** John Doe <CreditScore: 750>
<4589654465226546564216654896> Thread <abcd.efg.com>
ExecuteThread <Account> <456987422221>

RECEIVE A REGEX LIST INCLUDING A FIRST AND SECOND REGEX PATTERN AND A DATASET
602

DETERMINE WHETHER THE DATASET CONTAINS THE FIRST REGEX PATTERN AND NUMBER OF OCCURRENCES OF THE FIRST REGEX PATTERN
604

DETERMINE WHETHER THE DATASET CONTAINS THE SECOND REGEX PATTERN AND NUMBER OF OCCURRENCES OF THE SECOND REGEX PATTERN
606

GENERATE A VECTOR AND INCREMENT REGEX VALUES IN THE VECTOR BASED ON THE NUMBER OF OCCURRENCES OF THE CORRESPONDING REGEX PATTERNS
608

PERFORM NORMALIZATION OF THE VECTOR AND PROVIDE THE VECTOR TO ONE OR MORE MACHINE LEARNING MODELS AND/OR NAMED ENTITY RECOGNITION SYSTEMS
610

*FIG. 6*

UTILIZING REGULAR EXPRESSION EMBEDDINGS FOR NAMED ENTITY RECOGNITION SYSTEMS

CROSS-REFERENCE TO RELATED APPLICATIONS

This application is a continuation of U.S. patent application Ser. No. 16/549,786, entitled "UTILIZING REGULAR EXPRESSION EMBEDDINGS FOR NAMED ENTITY RECOGNITION SYSTEMS" filed on Aug. 23, 2019. The contents of the aforementioned application are incorporated herein by reference in their entirety.

BACKGROUND

Named-entity recognition (NER), which may also be known as entity identification, entity chunking, or entity extraction, may be a subtask of information extraction that aims to locate and classify named entity mentions in unstructured text or data into pre-defined categories, such as names, organizations, locations, medical codes, time expressions, quantities, monetary values, percentages, etc.

NER-based systems may be integrated in natural language processing (NLP) systems and may implement or utilize machine learning algorithms to process and analyze plain text. Typically, many machine learning algorithms or deep learning architectures are incapable of processing plain text or text strings in their raw form and may require numbers as inputs, e.g., classification, regressions, etc., to perform various tasks.

Embedding techniques, such as word embedding, allow text to be converted into numbers or numerical representations of the text. Generally, a word embedding format may map a word using a dictionary to a vector. For example, a dictionary may be a list of unique words in a text string or text set. A vector representation of a word may be a "one-hot" encoded vector in which a number, such as one, stands for the position where the word exists. Zeros may be filled in everywhere else in the vector.

One disadvantage of utilizing a dictionary of words may be that dictionaries require a large amount of storage space. Another disadvantage may be that word embedding techniques are only as effective as the quantity and diversification of the words contained in the dictionary being used. According, there is a need to more succinctly describe text and increase discernibility in data type classification.

SUMMARY

Various embodiments are generally directed to a system that utilizes regular expression (regex) to recognize at least portions of characters, words, text, numbers, etc. in a structured or unstructured dataset, any patterns associated therewith, and/or similarities between the determined patterns. In examples, a regex-based pattern recognition platform may receive a dataset and determine whether at least a first regex pattern and a second regex pattern can be identified. The occurrences of the first and second regex patterns and the frequency of those occurrences may reveal something about the dataset itself or any patterns contained therein.

BRIEF DESCRIPTION OF THE DRAWINGS

FIG. 2 illustrates an example dataset in accordance with one or more embodiments.

FIG. 3 illustrates an example regex list in accordance with one or more embodiments.

FIG. 4 illustrates an example recognition of regex patterns in accordance with one or more embodiments.

FIG. 6 illustrates an example flow diagram in accordance with one or more embodiments.

DETAILED DESCRIPTION

Figure 1:
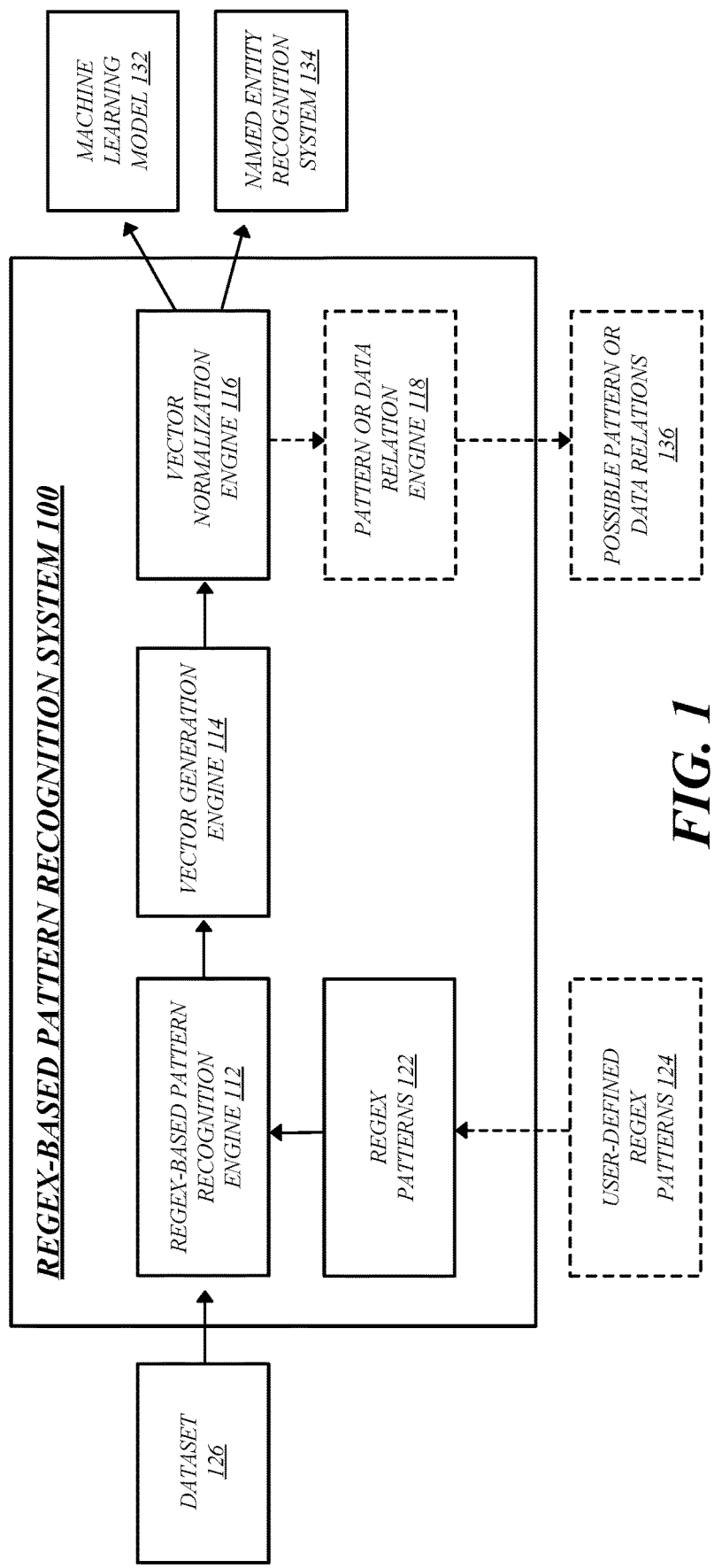
FIG. 1 illustrates an example regex-based pattern recognition system in accordance with one or more embodiments.

Various embodiments are generally directed to utilizing regular expression (regex) to recognize at least portions of characters, text, words, numbers, etc. in a dataset (structured or unstructured), any patterns associated with the characters, text, words, or numbers, and/or similarities between the determined patterns.

For example, the use of regex allows a more succinct description of the dataset for data type classification and may increase overall discernibility with respect to at least identifying various characters, words, text, numbers, etc. in the dataset and what the dataset may be referring to or describing (e.g., how to classify the dataset). It may be understood that regex may broadly refer to a sequence of characters that define a search pattern or may refer to a specific, standard textual syntax for representing patterns for matching text. As will be further described below, each character in a regex may be a metacharacter that has a special meaning or a regular character that has a literal meaning.

In examples, a regex-based pattern recognition platform may receive one or more portions of a dataset (structured or unstructured) and determine whether at least a first regex pattern and a second regex pattern can be identified in the received portions of the dataset. In further examples, a third regex pattern, a fourth pattern, a fifth pattern, a sixth pattern, and so on may also be identified. The regex patterns may be provided to the platform as a predefined (e.g., user defined, model defined, etc.) list of regex patterns.

According to embodiments, each regex pattern may correspond a specific position in a vector (which may also be referred to as "vector position"). For instance, the first regex pattern may correspond to the first vector position, the second regex pattern may correspond to the second vector position, etc. Moreover, the number or value indicated in each vector position may represent how many times the corresponding regex pattern occurred or was identified in the dataset. In some examples, the vector may be normalized if, for instance, there is an imbalance of occurrences of a particular regex pattern compared to other patterns.

According to examples, the predefined list of regex patterns may be tailored, configured, or modified based on the kinds of information or pattern(s) a user may be looking to identify or analyze in the dataset, such as personally identifiable information (PII). It may be understood that more than one list of regex patterns may be utilized and in any suitable manner. The list(s) of regex patterns may be refined and improved by applying machine learning and/or neural network models. For instance, if a particular set of regex patterns are commonly found in data that include information pertaining to a customer's loan or refinancing application, then that set of patterns may be further improved or refined to more accurately identify such information in other datasets.

Upon generating one or more vectors by the regex-based pattern recognition platform, the vector(s) may be provided to a machine learning model, a named-entity recognition (NER) system, or the like for further refining the training and classification processes related to extracting and understanding information.

As described above, one of the numerous problems in known solutions is that dictionary-based NER systems require massive amounts of storage to accommodate the numerous amounts of words associated with dictionaries. Moreover, the dictionary-based NER systems are limited in terms of their ability to recognize patterns and similarities between patterns in structured or unstructured datasets. The embodiments, examples, and aspects of the present disclosure overcome and are advantageous over the previous solutions in that at least patterns in datasets can be recognized to quickly and efficiently determine what kind of information is contained in the datasets. Further, by utilizing regex to generate vectors, storage and memory space can be greatly saved.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example regex-based pattern recognition system 100 according to embodiments. As shown, the pattern recognition system 100 may include at least a regex-based pattern recognition engine 112, a vector generation engine 114, a vector normalization engine 116, and a pattern or data relation engine 118 (which may be an optional component of the system 100, as indicated by the dashed box). It may be understood that the regex-based pattern recognition system 100 and the components therein may be executed, run, and/or supported by one or more computing devices. It may also be understood that while the regex-based pattern recognition system 100 is configured to recognize and determine various data patterns and relations therebetween, the platform 100 may not be limited to just that functionality and may also be configured to identify various words or text and/or further include additional components for various types of analyses.

In examples, the regex-based pattern recognition engine may receive or access one or more lists of regex patterns 122. As described above, the regex patterns 122 may allow the regex-based pattern recognition engine to search and identify any text, words, data contained in a structured or unstructured dataset that match the patterns indicated in the list(s) of the regex patterns 122. As set forth above, regex may broadly refer to a sequence of characters that define a search pattern or may refer to a specific, standard textual syntax for representing patterns for matching text, and each character in a regex pattern may be a metacharacter that has a special meaning or a regular character that has a literal meaning. An example metacharacter may be "[ ]," which instructs to check for any single character specified within the brackets. In another example, the metacharacter "*" may instruct to check for any number of occurrences (include zero occurrences) of the preceding character. Thus, the regex pattern or expression "[p]" may mean to identify all instances of the single character "p" in a given dataset. Other types of metacharacters and corresponding meanings may be known in the art.

The regex patterns 122 may include patterns created, developed, defined, etc. by users or machine-based models (e.g., machine learning models, neural network models). As illustrated, user-defined regex patterns may optionally be provided or included in the base set of regex patterns 122. The regex patterns 122 may be developed or curated to identify, detect, or implicate any type of data or data patterns. Since it is unknown what is in a dataset and since data is not received in the same manner every time, it may be important to scope the regex patterns 122 to capture or recognize a general data pattern in some examples, or in other examples, specific types of data or data patterns (e.g., customer PII) may be targeted by tailoring the regex patterns 122 to capture such information.

In embodiments, the regex patterns 122 may be tailored to recognize sensitive customer PII in datasets (structured or unstructured) and further determine any context behind the dataset (e.g., why the PII is being used, how the PII fits in the dataset) based on recognized patterns within the dataset. In one example, a regex pattern may be coded to describe, define, and/or implicate one or more of the following: (i) a predetermined number of sequential letters, (ii) a predetermined number of sequential numbers, (iii) a predetermined number of characters, (iv) a hyphen, (v) a "$" character, (vi) two sequential numbers followed by a first "/" character followed by two sequential numbers followed by a second "/" character followed by two to four sequential numbers, (vii) five sequential numbers followed by a hyphen followed by four sequential numbers, (viii) a dot character followed by two consecutive numbers, (ix) three consecutive numbers followed by a hyphen followed by four consecutive numbers, or (x) three consecutive numbers followed by a first hyphen followed by two consecutive numbers followed by a second hyphen followed by four consecutive numbers. Thus, information such as customer social security numbers, addresses, phone numbers, zip codes, account balances, etc. may be identified by the regex patterns 122.

As further shown in FIG. 1, the regex-based pattern recognition engine 112 may receive dataset 126, which may be structured or unstructured. In some examples, the pattern recognition engine 112 may be configured to determine whether the dataset 126 is structured or unstructured. Based on the regex patterns 122 received or accessed by the pattern recognition engine 112, the engine 112 may parse out information in the received dataset 126 that match, trigger, implicate, identify, or match the one or more regex patterns 122. Thereafter, the vector generation engine 114 may generate one or more vectors indicating at least which of the patterns 122 were identified and the number of occurrences thereof.

The one or more vectors generated by the vector generation engine 114 may then be provided to a vector normalization engine 116. The vector normalization engine 116 may normalize the one or more vectors if the numbers in the vector(s) are skewed in favor of particular data points. For example, if there are a hundred more occurrences of one regex pattern in a vector compared to the other patterns, then the vector may be normalized to correct or account for the skew. It may be understood that vector normalization may be an optional step and may not be required in all instances.

As illustrated, the one or more generated vectors, whether normalized or not, may be provided to various systems or models, such as a machine learning model 132 and a named entity recognition (NER) system 134. In examples, the machine learning model 132 may be part of the NER system 134. The one or more vectors and the information contained therein may be used to further train these types of models and systems, thereby improving their overall accuracy to detect and extract information.

Optionally or additionally, the one or more generated vectors may be provided to the pattern or data relation engine 118, which may be configured to determine any similarities or other types of relationships shared between the regex patterns identified in the dataset. As shown, the pattern or data relation engine 118 may output any likely pattern or data relations 136. In an example, a portion of (or the entire) dataset 126 may contain information pertaining to a customer applying for a loan or refinancing product, such as the customer's name, date of birth, social security number, addresses, phone numbers, income information, existing account information, employment information, credit history information, spousal information, load or refinancing terms, offered and/or accepted interest rates, etc. If regex patterns associated with such information are identified in the dataset on a predetermined number of occasions and in a manner that relates to each other in a predefined manner, then the pattern or data relation engine 118 may determine that the dataset 126 received by the platform 100 relates to a customer's loan or refinancing package application.

FIG. 2 illustrates an example dataset 200 according to embodiments. In examples, the dataset 200 may be an unstructured dataset 202. As shown, the unstructured dataset 202 may be information that does not have a predefined data model or is not organized is a predefined manner. The unstructured dataset 202 may include text, numbers, symbols, characters, or any combination thereof.

In examples, the unstructured dataset 202 may be similar to the dataset 126 described in FIG. 1. The dataset 202 may have at least twelve separate lines, where a series of three or four "#" symbols indicate the start of a data string or a specific type of information. Descriptive information may be bracketed by the "<" or ">" symbols. As illustrated, after a series of three "#" symbols, a customer's social security number is included in the dataset 202. The information following the second set of "#" symbols is the customer's phone number followed by the customer's home address. The fifth line of the dataset 202 reveals at least one customer offer, which was a $10,000 USD loan having a 36-month repayment term at a 3.5% interest rate. As further shown, the sixth line indicates the customer's date of birth and the customer's occupation and employer name on the sixth line. The last three lines reveal the customer's name, credit score, and an account number associated with the customer.

It may be understood that while the unstructured dataset 202 includes information and text that is readily discernable, the dataset 202 may not be limited to how it is illustrated in FIG. 2. It may be understood that datasets, particularly unstructured datasets, may include large amounts of symbols, text, or otherwise undiscernible information.

FIG. 3 illustrates an example regex list 300 according to embodiments. The regex patterns included in the regex list 300 may be similar to the regex patterns 122 described in FIG. 1. As shown, regex list 300 includes regex patterns 304, 306, 308, 310, 312, 314, 316, 318, all the way up to regex pattern "n," as indicated by the ellipses.

In embodiments, regex pattern 304 may be described, defined, or coded in such a way to identify at least a portion of a social security number. Thus, regex pattern 304 may identify any characters in a dataset that match the following possible formats: three sequential numbers followed by a hyphen, four sequential numbers followed by a hyphen, or three sequential numbers followed by a hyphen and two sequential numbers followed by a hyphen and then four sequential numbers.

Similarly, regex pattern 306 may be described, defined, or coded in a manner to at least identify portions of a customer name. Regex pattern 308 may identify at least portions of a phone number. Moreover, regex pattern 310 may identify at least portions of an address, regex pattern 312 may identify portions of account information, regex pattern 314 may identify portions of a product offer, regex pattern 316 may identify at least portions of a credit score, regex pattern 318 may identify portions of a customer's occupation, regex pattern "n" may identify at least portions of a customer's date of birth, and so on.

While the regex patterns included in the regex list 300 relate to customer PII and identifying such information in a given dataset, it may be understood that the regex list 300 may be tailored to identify other types of information, patterns, etc. For example, the patterns may be associated with identifying a particular number pattern, serial numbers, bar code numbers, book numbers, numbers or letters separated by special characters (e.g., %, $, @, !, *, &), hidden values (e.g., ****), etc. Moreover, it may be understood that regex patterns or expressions may be automatically and/or dynamically generated based on text extraction and classification, e.g., the regex patterns or expressions may be learned from one or more samples. One of the numerous advantages is that creating deep learning embeddings associated with regular expressions for recognizing personally identifiable information, for example, can provide relationships between regex patterns in the regex list 300, which could be type of data matched, parts of regular expressions that are commonly used together, etc.

FIG. 4 illustrates an example recognition 400 of regex patterns according to embodiments. For ease of explanation, the data set 202 described in FIG. 2 will be used to describe the pattern recognition 400. By way of example, the example recognition 400 shown in FIG. 4 may be the result of receiving, by a regex-based pattern recognition engine (e.g., engine 112 shown in FIG. 1), the unstructured data set 202 of FIG. 2 and applying the regex patterns of regex list 300 shown in FIG. 3.

For example, the regex-based pattern recognition engine may identify all of the PII related to a customer contained in the dataset 202, e.g., social security number, phone number, address, load or refinancing offer and terms of that offer, date of birth, occupation, employer name, name of customer, credit score, and account numbers, as indicated by the dashed boxes. For example, the numbers in the top-most dashed box implicate regex pattern 304, which matches one or more of the following: three sequential numbers followed by a hyphen, four sequential numbers followed by a hyphen, or three sequential numbers followed by a hyphen and two sequential numbers followed by a hyphen and then four sequential numbers, as described above. The other identified text, numbers, characters, etc. may similarly be the result of implicated or matched regex patterns in regex list 300.

Upon determining what type of data is identified in dataset 202, the regex-based pattern recognition engine may further determine any relations that the one or more portions of the dataset 202 may share. For example, the regex-based pattern recognition engine may determine that the type of data identified (e.g., PII) and the number of occurrences of the data in the dataset may indicate that one or more portions of the dataset 202 may be part of a customer's loan or refinancing application. In other examples and as described above, this type or other types of pattern-related information may be provided to external machine learning models, named entity recognition systems (which may implement regex embedding based on one or more vectors provided thereto), etc. to further refine and train them to determine these types of patterns.

In some examples, the PII identified in the dataset 202 may be replaced with the corresponding regex pattern to further enhance protection of sensitive information and improve security related functions. Moreover, it may be understood that false matches or implications of regex patterns within a given dataset, or generally, occurrences of error, may be improved by further refining at least the regex patterns and fine tuning via machine learning, classification models, or otherwise regex lists and the regex-based pattern recognition engines.

Figure 5:
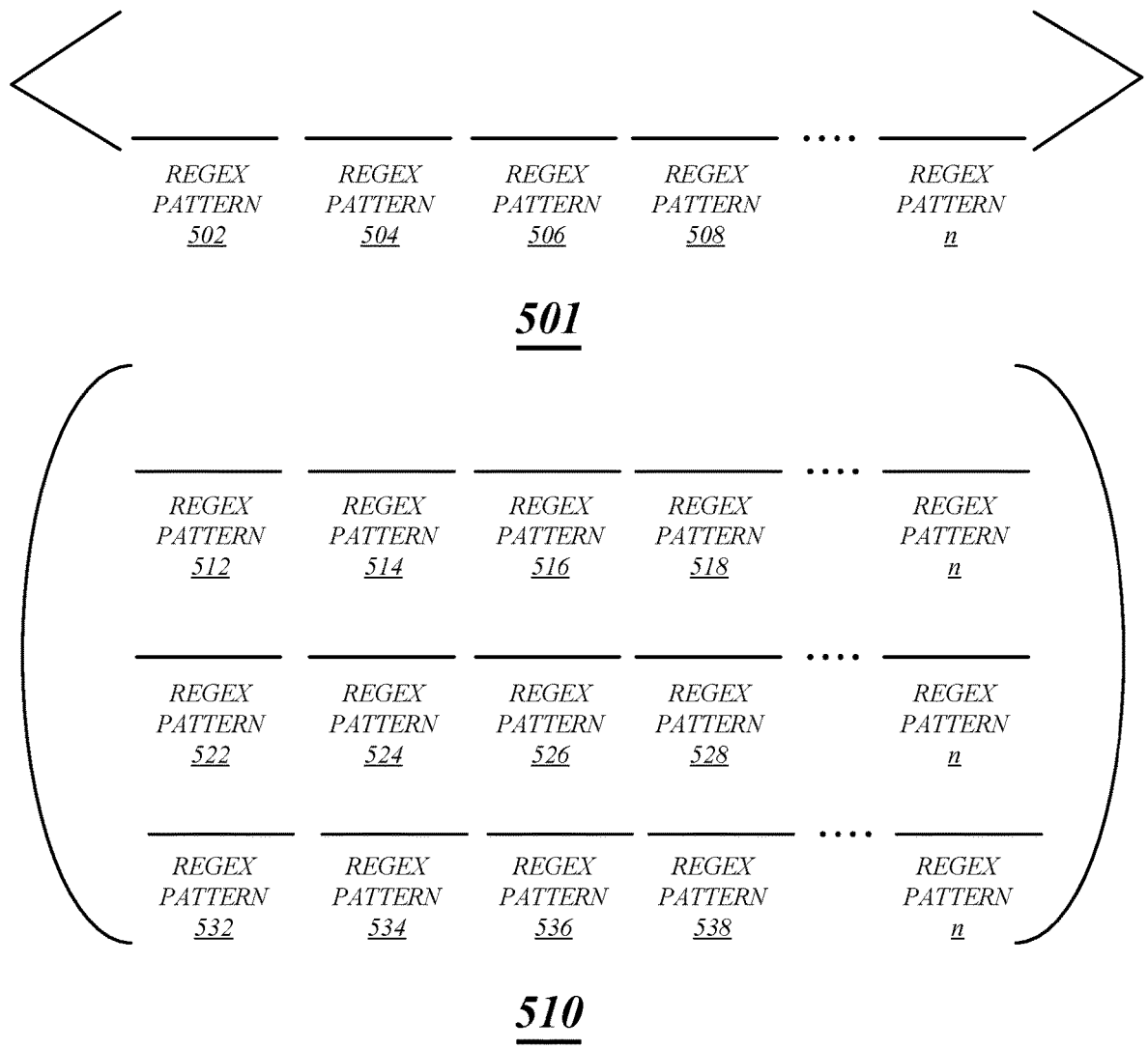
FIG. 5 illustrates example vectors in accordance with one or more embodiments.

FIG. 5 illustrates example vectors 500 according to embodiments. As described above, one or more vectors may be generated to describe the various words or text that match or implicate regex patterns. In FIG. 5, two different types of vectors are shown. For example, vector 501 may be a one-dimensional vector, and in a further example, vector 510 may be a multi-dimensional vector.

As shown, vector 501 has numerous vector positions, each of which corresponds to a regex pattern (e.g., regex patterns 502, 504, 506, 508, and up to regex pattern "n"). For every occurrence, identification, or implication of a regex pattern in a dataset, a regex value or vector value corresponding to that regex pattern may be incremented by one (or any other suitable value). Thus, if regex pattern 502 occurs four times in the dataset, the regex value for the vector position corresponding to regex pattern 502 is four.

As further illustrated, vector 510 may be configured similarly to vector 501, except vector 501 has multiple tiers of vector positions and corresponding regex values. For example, vector 510 may be useful when implementing more than one regex list, where each line or tier can represent each list. In examples, when a regex value is significantly higher or higher than a predefined threshold relative to the other regex values, normalization of the data skew within the vector may be performed.

In further examples, each consecutive value corresponding to a regex pattern may be replaced with the encoding of that pattern or the entire word with the encoding which represents that pattern. For instance, a social security number, such as 123-456-7890, may be represented by "dddsdddsdddd," where "d" indicates a digit and where "s" indicates a special character. In another instance, the social security number may be represented by "3D"s, "3D"s, and "4D," where "3D" represents the encoding of 3 digits in a row, "s" represents a special character, and "4D" represents the encoding of 4 digits in a row. In at least this regard, if using unstructured text, each character in a sequence (e.g., sequential letters, sequential numbers, sequential punctuations) can be replaced with the regex that best identifies it. And training may be performed as normal for other named entity recognition, and further, it may be used instead of character embeddings in combination with word embeddings or prefix embedding.

As described above, the vector may then be provided to external models, such as machine learning models or NER models or systems to further refine and train those models or systems to more efficiently recognize patterns within unknown datasets and determine how multiple datasets may be related to each other. In other examples, the vector may be used by the regex-based pattern recognition system to achieve the same. It may be understood that regex pattern(s), regex value(s), and/or vector(s) may be included as an ensemble within the external model, such as a machine learning model, and may be combined with other external model features for prediction.

FIG. 6 illustrates an example flow diagram 600 according to one or more embodiments. It may be understood that the features associated with the illustrated blocks may be performed or executed by one or more computing devices and/or processing circuitry contained therein that can run, support, execute a regex-based pattern recognition system, such as the one illustrated in FIG. 1.

At block 602, a regex list that includes at least a first regex pattern and a second regex pattern may be received by the regex-based pattern recognition system. As described above, the regex list may be tailored to identify any type of information, data pattern, relation between the data patterns, etc. in any suitable manner. For instance, the first and second regex patterns may be written to identify or implicate customer PII (or any sensitive information) in a given dataset.

At block 604, it may be determined whether the dataset, which may be structured or unstructured, contains the first regex pattern and it is further determined how many times the first regex pattern is identified or implicated in the dataset. Similarly, at block 606, it may be determined whether the dataset contains the second regex pattern and how many times the second regex pattern is identified or implicated in the dataset.

At block 608, a vector may be generated based on the determinations made at blocks 604 and 606. For instance, if there are a total of six occurrences of the first regex pattern and two occurrences of the second regex pattern, the vector may indicate regex values of six and two in their respective vector positions, as described above. It may be understood that the same process may be performed for a third regex pattern, a fourth regex pattern, and so on.

At block 610, normalization may be performed on the generated vector, particularly if the number of occurrences of one or more regex patterns is much greater than the number of occurrences of other regex patterns. It may be understood that the normalization process corrects or attempts to correct the data skew in the vector. The normalized vector may then be provided to one or more machine learning models and/or NER systems or models, as described above. In some examples, the vector may be used by the regex-based pattern recognition system to identify various patterns or relations between the identified regex patterns in the dataset and the occurrences thereof in order to understand the information contained in the dataset and train the models for improving such processes.

Figure 7:
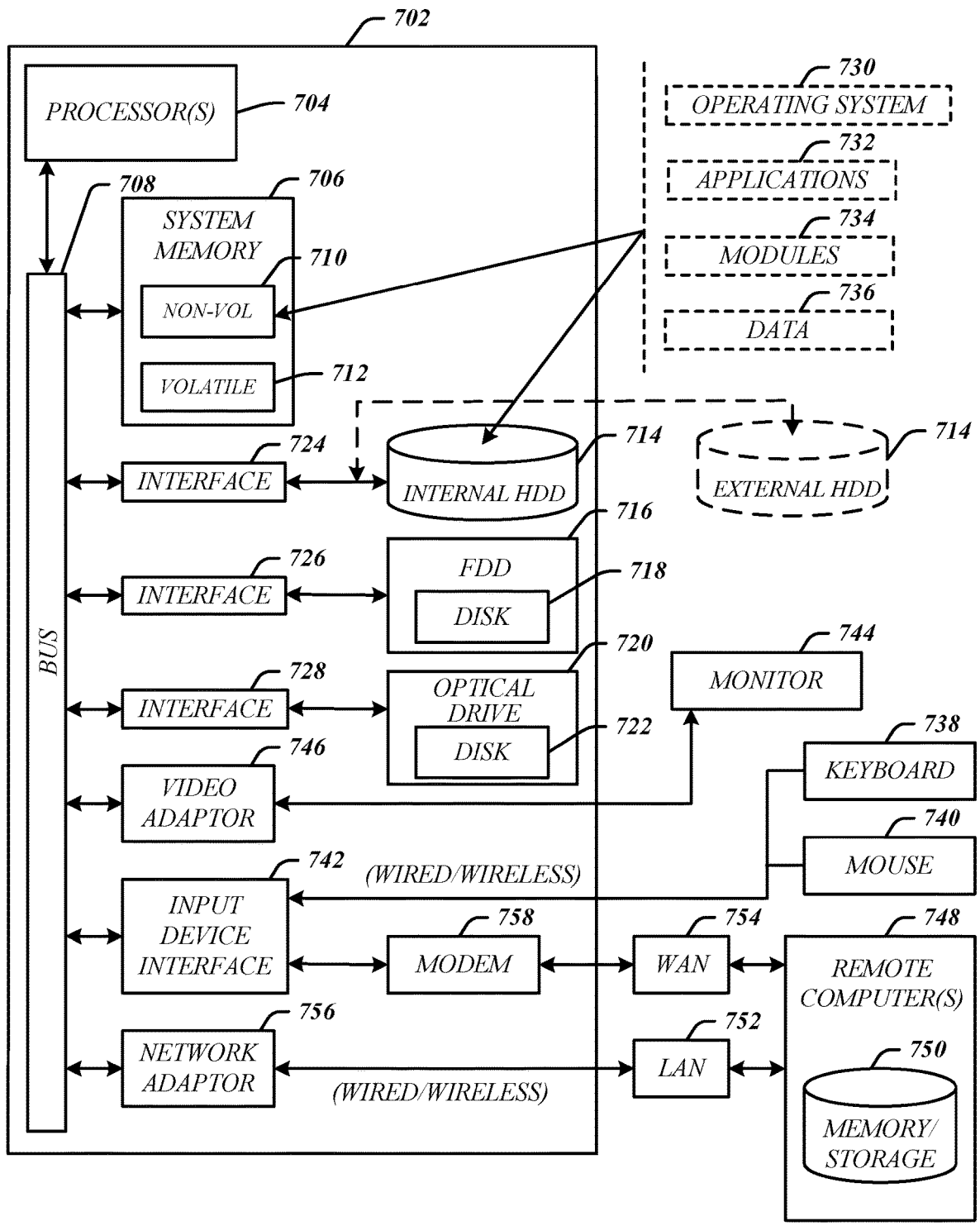
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices implementing the computing architecture 700 may be configured to at least run, execute, support, or provide the regex-based pattern recognition system, such as the one shown in FIG. 1, and related functionalities.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
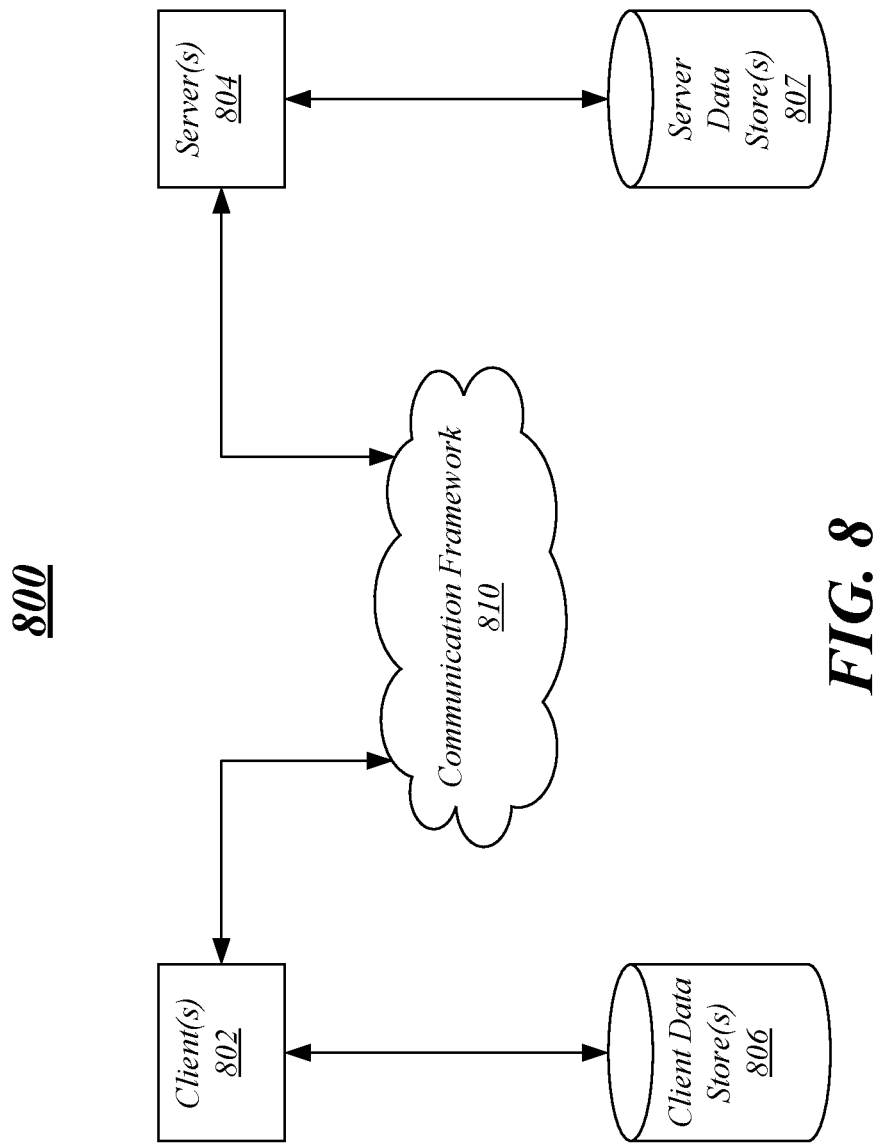
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more server computers, which may be implemented as a back-end server or a cloud-computing server, which may run the regex-based pattern recognition system described herein and perform all related functionalities. At least a second computing device connected to the network may be a user computing device or other computing devices that support machine learning models (e.g., machine learning model 132), various systems (e.g., named entity recognition system 134), and other types of internal or external users and systems.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   determining, via one or more processors, whether a dataset comprises unstructured text;
   determining, via the one or more processors, that at least a portion of the unstructured text corresponds to a regex pattern of a regex list, wherein the regex pattern comprises at least one metacharacter, the at least one metacharacter associated with a non-literal meaning;

replacing, via the one or more processors, the portion of the unstructured text with an encoding that represents the regex pattern to generate a modified dataset; and providing at least the modified dataset to at least one entity recognition system.

2. The method of claim 1, wherein the portion of the unstructured text is a first character, the first character being an alphanumeric character or special character.

3. The method of claim 2, wherein the encoding is a second character, the second character being an alphanumeric character or a special character.

4. The method of claim 1, wherein the portion of the unstructured text is a string of two or more consecutive characters, the two or more consecutive characters of the strings being alphanumeric characters or special characters.

5. The method of claim 4, wherein the encoding is a word of at least one character, the at least one character of the word being an alphanumeric character or a special character.

6. The method of claim 1, further comprising:

determining, via the one or more processors, any false matches between the regex pattern of the regex list and the dataset;

refining, based on any determined false matches, the regex list via a machine learning model or a classification model.

7. At least one non-transitory computer-readable storage medium storing computer-readable program code executable by at least one processor to:

determine whether a dataset comprises unstructured text;

determine that at least a portion of the unstructured text corresponds to a regex pattern of a regex list, wherein the regex pattern comprises at least one metacharacter, the at least one metacharacter associated with a non-literal meaning;

replace the portion of the unstructured text with an encoding that represents the regex pattern to generate a modified dataset; and provide at least the modified dataset to at least one entity recognition system.

8. The at least one non-transitory computer-readable storage medium of claim 7, wherein the portion of the unstructured text is a first character, the first character being an alphanumeric character or special character.

9. The at least one non-transitory computer-readable storage medium of claim 8, wherein the encoding is a second character, the second character being an alphanumeric character or a special character.

10. The at least one non-transitory computer-readable storage medium of claim 7, wherein the portion of the unstructured text is a string of two or more consecutive characters, the two or more consecutive characters of the strings being alphanumeric characters or special characters.

11. The at least one non-transitory computer-readable storage medium of claim 10, wherein the encoding is a word of at least one character, the at least one character of the word being an alphanumeric character or a special character.

12. The at least one non-transitory computer-readable storage medium of claim 7, wherein the computer-readable program code further causes the at least one processor to:

determine any false matches between the regex pattern of the regex list and the dataset; and refine, based on any determined false matches, the regex list via a machine learning model or a classification model.

\* \* \* \* \*